United States Patent
Snyder et al.

(10) Patent No.: US 10,287,916 B2
(45) Date of Patent: May 14, 2019

(54) INTERNAL TUBE OIL COKE PREVENTION GEOMETRY

(71) Applicant: United Technlologies Corporation, Farmington, CT (US)

(72) Inventors: Ryan K. Snyder, Glastonbury, CT (US); Thomas Bruce Avis, Manchester, CT (US); Francis Parnin, Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 419 days.

(21) Appl. No.: 15/170,221

(22) Filed: Jun. 1, 2016

(65) Prior Publication Data

US 2017/0350274 A1    Dec. 7, 2017

(51) Int. Cl.
F01D 25/18 (2006.01)
F01D 25/24 (2006.01)
F01M 11/02 (2006.01)
F02C 3/04 (2006.01)

(52) U.S. Cl.
CPC .......... F01D 25/18 (2013.01); F01D 25/183 (2013.01); F01D 25/24 (2013.01); F01M 11/02 (2013.01); F02C 3/04 (2013.01); F05D 2220/32 (2013.01); F05D 2240/55 (2013.01); F05D 2240/60 (2013.01); F05D 2260/98 (2013.01)

(58) Field of Classification Search
CPC ........ F01D 25/18; F01D 25/183; F01D 25/16; F05D 2260/98
See application file for complete search history.

(56) References Cited

U.S. PATENT DOCUMENTS

| 3,527,054 | A | * | 9/1970 | Hemsworth | F01D 11/04 60/39.08 |
|---|---|---|---|---|---|
| 7,878,302 | B2 | | 2/2011 | Smith | |
| 8,226,351 | B2 | * | 7/2012 | Shashank | F01D 25/18 415/112 |
| 8,596,106 | B2 | * | 12/2013 | Tang | B21D 37/16 72/342.1 |
| 9,316,118 | B2 | * | 4/2016 | Alvarez | F01D 25/18 |
| 2015/0275761 | A1 | | 10/2015 | Duffy et al. | |
| 2016/0084111 | A1 | * | 3/2016 | Bei | F01D 11/06 415/1 |

FOREIGN PATENT DOCUMENTS

| EP | 1731719 A1 | 12/2006 |
|---|---|---|
| EP | 2538055 A2 | 12/2012 |
| FR | 2936273 A1 | 3/2010 |

OTHER PUBLICATIONS

Extended European Search Report for EP Application No. 17173426.2, dated Nov. 10, 2017, 7 pages.

* cited by examiner

*Primary Examiner* — Ninh H. Nguyen
(74) *Attorney, Agent, or Firm* — Kinney & Lange, P.A>

(57) ABSTRACT

A gas turbine engine includes a bearing compartment with a bottom disposed opposite a top. An outlet is formed in the bottom of the bearing compartment. A seal is positioned between the bottom of the bearing compartment and the top of the bearing compartment. A scavenge line is connected to the outlet. The scavenge line forms a fluid trap that extends in a first direction from the outlet and the bottom of the bearing compartment and then extends in a second direction to a position disposed vertically between the bottom of the bearing compartment and the seal.

12 Claims, 3 Drawing Sheets

INTERNAL TUBE OIL COKE PREVENTION GEOMETRY

BACKGROUND

The present disclosure relates to lubrication systems for gas turbine engines and more particularly to a solution for overcoming oil coking in the lubrication system.

Every gas turbine engine includes bearings to support the rotary shafts of the engine. The bearings are typically housed in bearing compartments that are connected to a lubrication system. The lubrication system provides lubricant, such as oil, to the bearing compartment through a supply line to lubricate and cool the bearings. The lubrication system also recovers the oil from the bearing compartment through a scavenge line and sends the oil through a filter and heat exchanger before cycling the oil back to the bearing compartment.

At shutdown of the gas turbine engine, the lubrication system ceases to circulate oil to the bearing compartment and the oil, now without pumping pressure, drains out of both the supply line and the scavenge line and back to a sump or nose point in the lubrication system. With the lubrication system inactive and no longer dissipating heat from the bearing compartment, heat produced by the gas turbine engine just prior to shutdown can "soak back" into both the bearing compartment and the supply and scavenge lines and can excessively elevate the temperature of these engine components. The elevated temperatures caused by the heat soak back can cause oil mist or oil film located in the supply line and the scavenge line to react with air and form coke deposits on the inside surfaces of the supply line and the scavenge line. Over time, these coke deposits can accumulate and clog the supply line and the scavenge line and starve the bearing compartment of oil. Without an adequate supply of oil, the bearings in the bearing compartment can fail and result in engine-wide failure of the gas turbine engine.

SUMMARY

In one aspect of the disclosure, a gas turbine engine includes a bearing compartment with a bottom disposed opposite a top. An outlet is formed in the bottom of the bearing compartment. A seal is positioned between the bottom of the bearing compartment and the top of the bearing compartment. A scavenge line is connected to the outlet. The scavenge line forms a fluid trap that extends in a first direction from the outlet and the bottom of the bearing compartment and then extends in a second direction to a position disposed vertically between the bottom of the bearing compartment and the seal.

In another aspect of the disclosure, a gas turbine engine includes a core casing and a bearing compartment disposed within the core casing. The bearing compartment includes a bottom disposed vertically opposite a top and an outlet formed in the bottom of the bearing compartment. A seal is positioned vertically between the bottom of the bearing compartment and the top of the bearing compartment. A scavenge line is connected to the outlet. The scavenge line forms a fluid trap that first extends vertically downward from the outlet and the bottom of the bearing compartment and exits the core casing, and then extends upward to a position disposed vertically between the bottom of the bearing compartment and the seal.

Persons of ordinary skill in the art will recognize that other aspects and embodiments of the present invention are possible in view of the entirety of the present disclosure, including the accompanying figures.

Figure 1:
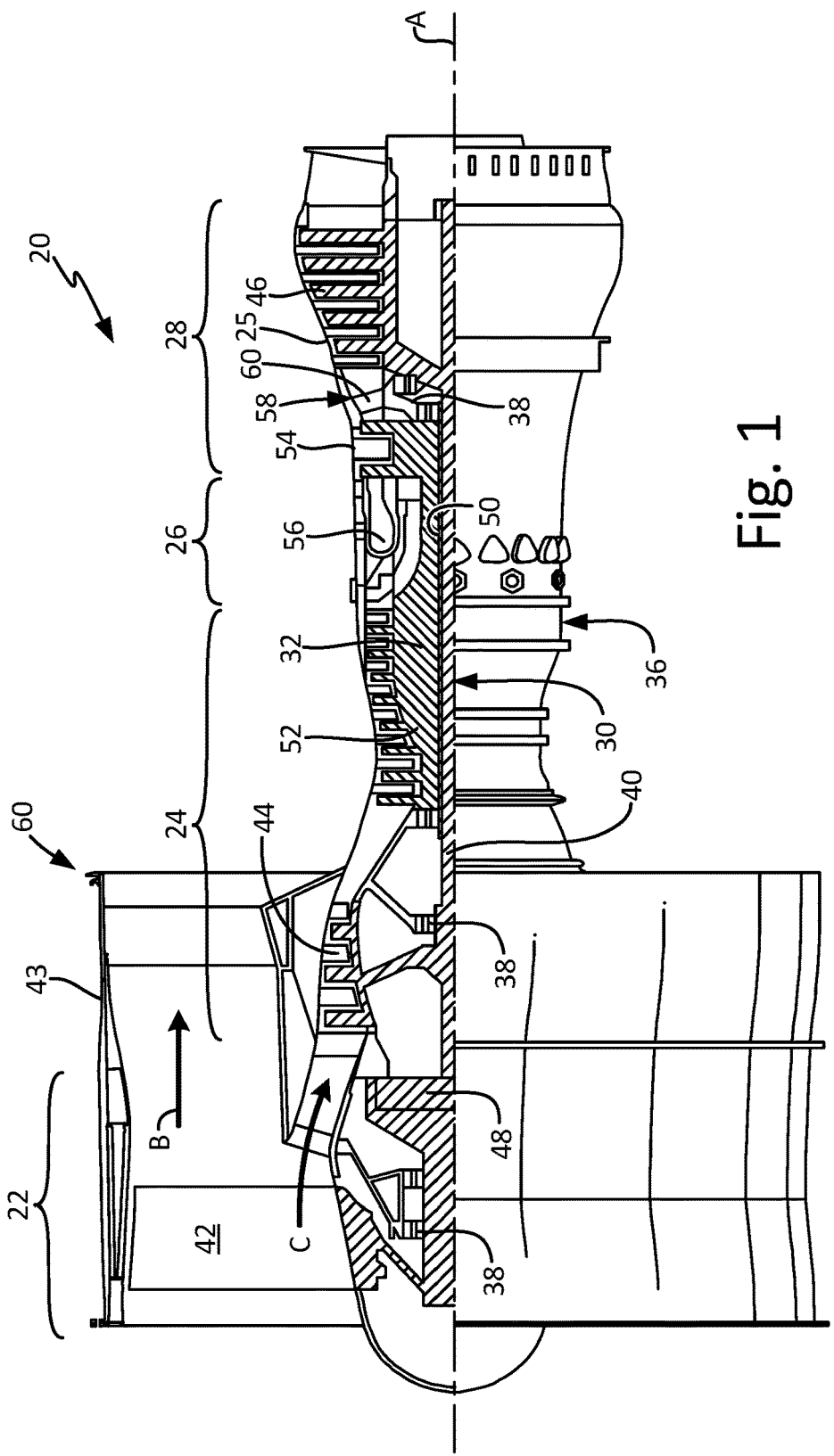
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a bearing compartment in a gas turbine engine with an outlet and a scavenge line for draining lubricating fluid from the bearing compartment. The scavenge line includes a fluid trap attached to the outlet that extends downward and then extends upward to a position disposed vertically between the outlet and a shaft seal of the bearing compartment. A supply line is connected to the bearing compartment and extends above the bearing compartment to form a fluid reservoir with enough volume to fill the fluid traps in the supply and scavenge lines upon engine shutdown. At engine shutdown, the lubricating fluid in the fluid reservoir flows into the bearing compartment and into the scavenge fluid trap, filling the fluid traps with lubricating fluid without flooding the bearing compartment to the level of the shaft seal. Because the fluid traps are filled with lubricating fluid, the residual heat of the engine at shutdown is unable to cause coking in the supply and scavenge lines of the bearing compartment. The fluid reservoir and fluid traps are discussed below with reference to the figures.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flowpath B while compressor section 24 draws air in along core flowpath C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Core casing 25 is disposed around compressor section 24, combustor section 26 and turbine section 28 and separates these sections from bypass flowpath B.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis A.

Combustor 56 is arranged between high pressure compressor 52 and high pressure turbine section 54. In one example, high pressure turbine section 54 includes at least two stages to provide double stage high pressure turbine section 54. In another example, high pressure turbine section 54 includes only a single stage. As used herein, a "high pressure" compressor or turbine experiences a higher pressure than a corresponding "low pressure" compressor or turbine.

Mid-turbine frame 58 of engine static structure 36 can be arranged generally between high pressure turbine section 54 and low pressure turbine 46. Mid-turbine frame 58 further supports bearing systems 38 in turbine section 28 as well as setting airflow entering the low pressure turbine 46.

The gas flow in core flowpath C is compressed first by low pressure compressor 44 and then by high pressure compressor 52 mixed with fuel and ignited in combustor 56 to produce high pressure exhaust gases that are then expanded through high pressure turbine section 54 and low pressure turbine 46. Mid-turbine frame 58 includes vanes 60, which are in the core flowpath and function as an inlet guide vane for low pressure turbine 46.

Figure 2:
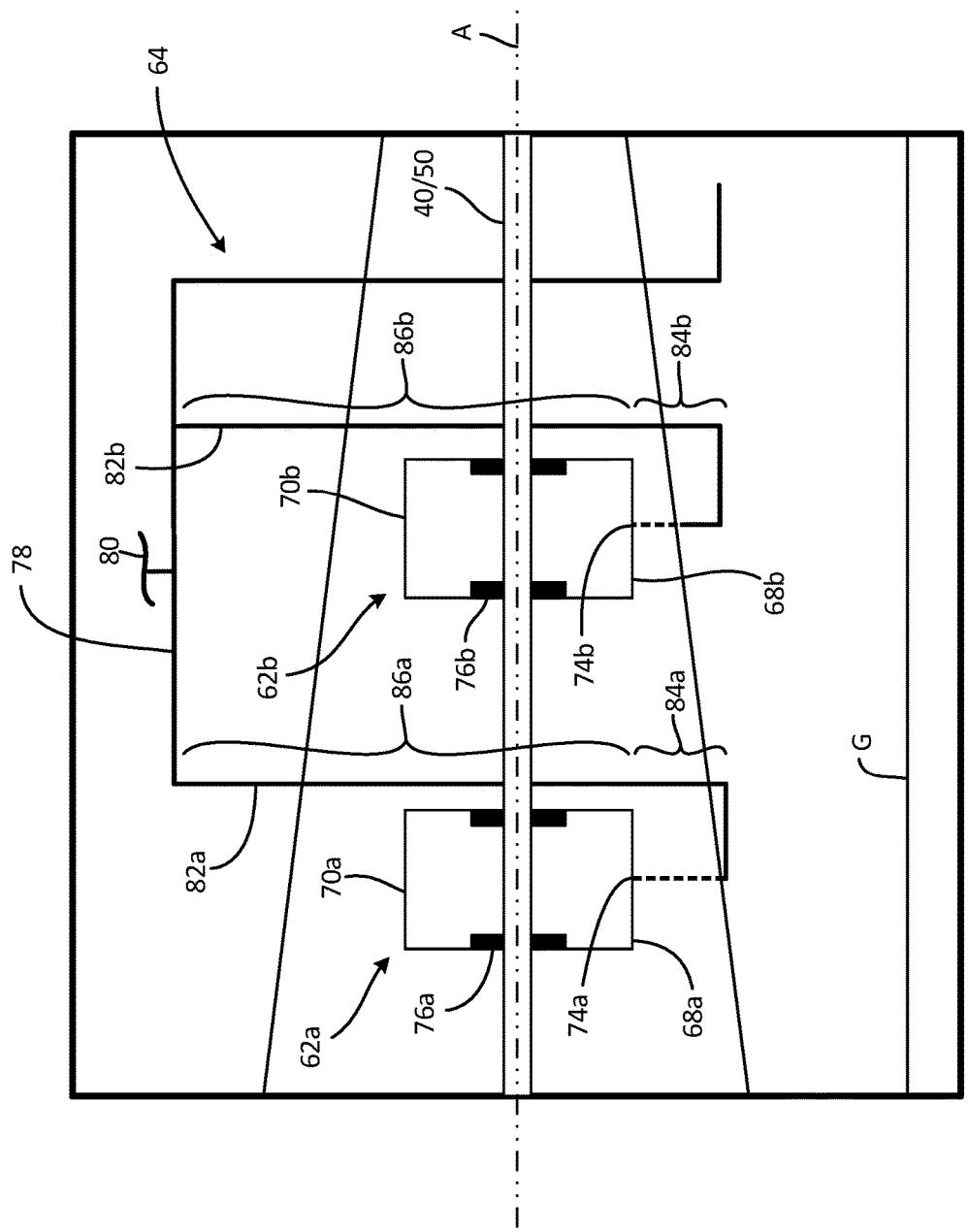
FIG. 2 is a schematic illustration of a fluid supply system for a first bearing compartment and a second bearing compartment in a turbine section of the gas turbine engine from FIG. 1.
Figure 3:
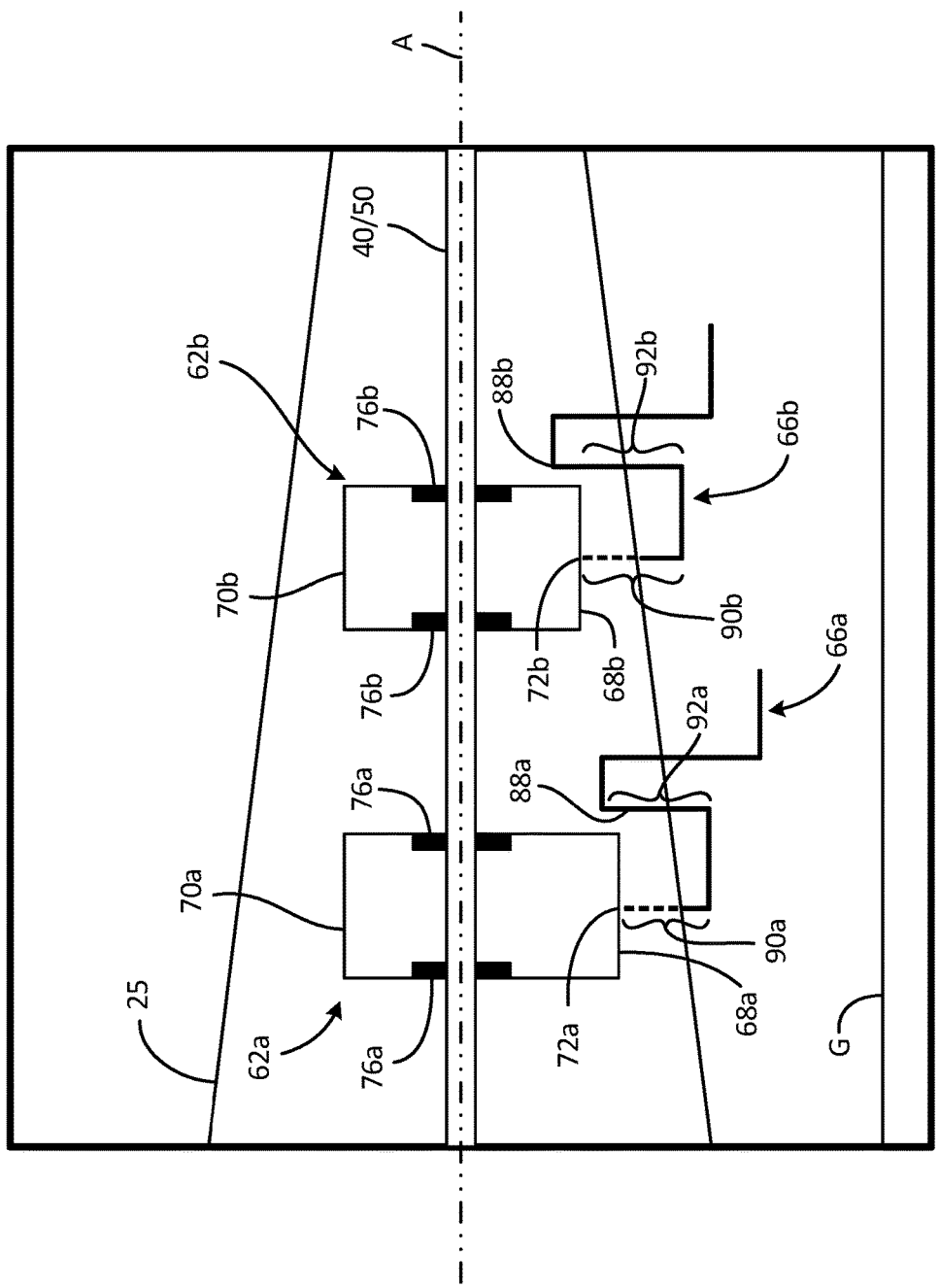
FIG. 3 is a schematic illustration of a fluid scavenge system for the first bearing compartment and the second bearing compartment from FIG. 2.

FIGS. 2 and 3 will be discussed concurrently. FIG. 2 is a schematic illustration of first bearing compartment 62a, second bearing compartment 62b, and fluid supply line 64. FIG. 3 is a schematic illustration of first bearing compartment 62a and second bearing compartment 62b from FIG. 2 connected to first scavenge line 66a and second scavenge line 66b respectively. First bearing compartment 62a and second bearing compartment 62b are disposed within core casing 25 and can be disposed in low pressure turbine section 46, high pressure turbine section 54, and/or mid-turbine frame 58. First bearing compartment 62a and second bearing compartment 62b can each house and enclose one or more bearing assemblies. First bearing compartment 62a and second bearing compartment 62b are positioned on center axis A of gas turbine engine 20 and inner shaft 40 and/or outer shaft 50 can extend through first bearing compartment 62a and second bearing compartment 62b. As shown in FIGS. 2 and 3, first bearing compartment 62a includes bottom 68a, top 70a, outlet 72a, inlet 74a, and seals 76a. Similar to first bearing compartment 62a, second bearing compartment 62b includes bottom 68b, top 70b, outlet 72b, inlet 74b, and seals 76b.

Bottom 68a of first bearing compartment 62a is disposed opposite top 70a. When gas turbine engine 20 is attached to an aircraft and that aircraft is parked on ground G, top 70a of first bearing compartment 62a is disposed vertically above bottom 68a relative to ground G. Both inlet 74a and outlet 72a of first bearing compartment 62a are formed in bottom 68a. Inlet 74a is a nozzle that allows lubricating fluid, such as oil, to enter first bearing compartment 62a. Outlet 72a is an orifice that allows the oil to exit first bearing compartment 62a. Seals 76a are positioned vertically between bottom 68a and top 70a of first bearing compartment 62a. Seals 76a can be carbon seals that are disposed around shaft 40/50 where shaft 40/50 enters and exits first bearing compartment 62a. Seals 76a help prevent dust or debris from entering first bearing compartment 62a from outside and also help prevent oil from exiting first bearing compartment 62a into the high temperature environment of turbine section 28. Second bearing compartment 62b, bottom 68b, top 70b, outlet 72b, inlet 74b, and seals 76b are configured in a similar manner as described above with reference to first bearing compartment 62a, bottom 68a, top 70a, outlet 72a, inlet 74a, and seals 76a.

As shown in FIG. 2, fluid supply line 64 includes main line 78, anti-siphon line 80 attached to lubrication venting system (not shown), first supply line 82a, and second supply line 82b. First supply line 82a includes lower portion 84a and upper portion 86a. Second supply line 82b includes lower portion 84b and upper portion 86b. Upper portions 86a and 86b of the supply lines 82a and 82b are lubrication fluid reservoirs that fill the traps during shutdown.

Main line 78 of fluid supply line 64 is disposed outside core casing 25 and is positioned vertically above first bearing compartment 62a and second bearing compartment 62b with respect to ground G. Main line 78 can be connected to a fluid tank (not shown) for supplying oil to fluid supply line 64. First supply line 82a extends vertically downward from main line 78, enters core casing 25, and connects to inlet 74a of first bearing compartment 62a. The portion of first supply line 82a that is disposed within core casing 25 is indicated in phantom in FIG. 2. The portion of first supply line 82a that is disposed within core casing 25 and indicated in phantom in FIG. 2 can be disposed within a vane or strut of low pressure turbine section 46, high pressure turbine section 54, or mid-turbine frame 58. Second supply line 82b extends vertically downward from main line 78, enters core casing 25, and connects to inlet 74b of second bearing compartment 62b. The portion of second supply line 82b that is disposed within core casing 25 is indicated in phantom in FIG. 2 and can also be disposed within a vane or strut of low pressure turbine section 46, high pressure turbine section 54, or mid-turbine frame 58. Anti-siphon line 80 is positioned on main line 78 between first supply line 82a and second supply line 82b. Anti-siphon line 80 enters main line 78 from above and is configured to allow air to enter main line 78 at engine shutdown to prevent oil from being siphoned back up from first supply line 82a and second supply line 82b into main line 78. Anti-siphon line 80 can be connected to a breather line (not shown) as an air source. The air in the breather line can have a relatively high air to oil ratio and can vent to ambient pressure, i.e. the pressure of the environment outside of gas turbine engine 20.

First supply line 82a includes lower portion 84a and upper portion 86a. Upper portion 86a of first supply line 82a is defined as the portion of first supply line 82a that extends vertically above bottom 68a of first bearing compartment 62a. Lower portion 84a of first supply line 82a is defined as the portion of first supply line 82a that is disposed vertically below bottom 68a of first bearing compartment 62a with respect to ground G.

Following first supply line 82a from inlet 74a of first bearing compartment 62a to main line 78, lower portion 84a extends vertically downward from inlet 74a and bottom 68a of first bearing compartment 62a. Lower portion 84a of first supply line 82a then exits core casing 25. After exiting core casing 25, lower portion 84a of first supply line 82a then extends vertically upward to a position that is equal in vertical height with bottom 68a of first bearing compartment 62a. First supply line 82a transitions to upper portion 86a and continues from bottom 68a of first bearing compartment 62a to main line 78, main line 78 being positioned vertically above top 70a of first bearing compartment 62a. Upper portion 86a is substantially larger in volume and length than lower portion 84a so that upper portion 86a contains enough oil at engine shutdown to fill all of lower portion 84a plus portions of first scavenge line 66a (shown in FIG. 3).

Similar to first supply line 82a, second supply line 82b includes lower portion 84b and upper portion 86b. As shown in FIG. 2, lower portion 84b and upper portion 86b of second supply line 82b are configured in the same manner as lower portion 84a and upper portion 86a of first supply line 82a respectively.

As shown in FIG. 3, first scavenge line 66a is connected to outlet 72a of first bearing compartment 62a and second scavenge line 66b is connected to outlet 72b of second bearing compartment 62b. First scavenge line 66a includes fluid trap 88a formed by first portion 90a and second portion 92a of first scavenge line 66a. Second scavenge line 66b includes fluid trap 88b formed by first portion 90b and second portion 92b of second scavenge line 66b.

Second scavenge line 66b, fluid trap 88b, first portion 90b, and second portion 92b are all configured in a manner similar to first scavenge line 66a, fluid trap 88a, first portion 90a, and second portion 92a respectively, which manner is described below.

First portion 90a of first scavenge line 66a extends vertically downward from outlet 72a and bottom 68a of first bearing compartment 62a and exits core casing 25. The part of first portion 90a of first scavenge line 66a that is disposed inside core casing 25 is indicated in phantom in FIG. 3 and can be disposed within a vane or strut of low pressure turbine section 46, high pressure turbine section 54, or mid-turbine frame 58. After exiting core casing 25, first portion 90a transitions into second portion 92a of first scavenge line 66a. Second portion 92a of first scavenge line 66a extends vertically upward outside of core casing 25 to a position disposed vertically between a height of bottom 68a of first bearing compartment 62a and a height of seals 76a. First scavenge line 66a extends radially downward downstream from second portion 92a, as shown in FIG. 3. First portion 90a and second portion 92a together form fluid trap 88a. Fluid trap 88a has an inside volume that is equal to or less than the inside volume of upper portion 86a of first supply line 82a. Preferably, upper portion 86a of first supply line 82a includes an inside volume that is greater than the combined inside volumes of fluid trap 88a and lower portion 84a of first supply line 82a.

At engine shutdown, the volume of oil disposed in upper portion 86a of first supply line 82a flows downward under the influence of gravity into lower portion 84a of first supply line 82a. Because upper portion 86a is higher than inlet 74a to bearing compartment 62a and the anti-siphon line 80 allows air in main line 78, oil flows into first bearing compartment 62a through inlet 74a without emptying lower portion 84a of first supply line 82a. From there, the oil flows into outlet 72a and into first scavenge line 66a. Since upper portion 86a has a larger inside volume than lower portion 84a and fluid trap 88a combined, enough oil flows downward from upper portion 86a to fill both lower portion 84a of first supply line 82a and fluid trap 88a of first scavenge line 66a. With lower portion 84a of first supply line 82a and fluid trap 88a of first scavenge line 66a filled with oil at engine shutdown, the parts of lower portion 84a and the parts of fluid trap 88a disposed inside core casing 25 are better protected against coking because passages filled with oil require higher temperatures for coking to occur than passages that mostly contain air and small amounts of oil in the form of droplets or film.

While the oil fills lower portion 84a and fluid trap 88a, the oil flowing from upper portion 86a of first supply line 82a does not fill first bearing compartment 62a enough to reach seals 76a because the vertical height of fluid trap 88a is disposed vertically below seals 76a. Because fluid trap 88a keeps oil from reaching seals 76a, oil is unable to leak out of first bearing compartment 62a through seals 76a into the hot environment of turbine section 28 at engine shutdown.

The oil entering first scavenge line 88a can contain a considerable amount of air mixed with the oil, which will bubble out to high points in the scavenge line 88a and the bearing compartment 62a. The inside volume of fluid trap 88a can be decreased to help ensure that first supply line 82a is able to deliver enough oil to fill fluid trap 88a even when the oil in first scavenge line 88a is mixed with air. The inside volume of fluid trap 88a can be decreased by axially aligning fluid trap 88a with outlet 72a of first bearing compartment 62a relative center axis A of gas turbine engine 20. Axially aligning fluid trap 88a with outlet 72a of first bearing compartment 62a moves fluid trap 88a closer to first bearing compartment 62a thereby decreasing the length and inside volume of fluid trap 88a without decreasing the cross-sectional flow area of fluid trap 88a.

In view of the foregoing description, it will be recognized that the present disclosure provides numerous advantages and benefits. For example, the present disclosure provides first bearing compartment 62a with first supply line 82a and first scavenge line 66a. First scavenge line 66a includes fluid trap 88a with a height disposed vertically between bottom 68a and seals 76a of first bearing compartment 62a. First supply line 82a provides enough oil to fluid trap 88a to keep the portions of first supply line 82a and first scavenge line 66a disposed inside core casing 25 full of oil at engine shutdown. By keeping the portions of first supply line 82a and first scavenge line 66a disposed inside core casing 25 full of oil at engine shutdown, the soak back heat of the gas turbine engine at shutdown is insufficient to cause coking inside first supply line 82a and first scavenge line 66a. Protecting first supply line 82a and first scavenge line 66a against coking helps keep these passages clear so that first bearing compartment 62a receives a steady supply of oil during engine operation to keep the bearings therein cool and lubricated. Furthermore, the height of fluid trap 88a keeps oil from flooding first bearing compartment 62a and leaking out through seals 76a into the hot environment of turbine section 28.

The following are non-exclusive descriptions of possible embodiments of the present invention.

In one embodiment, a gas turbine engine includes a bearing compartment with a bottom disposed opposite a top. An outlet is formed in the bottom of the bearing compartment. A seal is positioned between the bottom of the bearing compartment and the top of the bearing compartment. A scavenge line is connected to the outlet. The scavenge line forms a fluid trap that extends in a first direction from the outlet and the bottom of the bearing compartment and then extends in a second direction to a position disposed vertically between the bottom of the bearing compartment and the seal.

The gas turbine engine of the preceding paragraph can optionally include, additionally and/or alternatively, any one or more of the following features, configurations and/or additional components:

the bearing compartment is disposed within a core casing of the gas turbine engine;

the fluid trap extends vertically downward from the outlet and the bottom of the bearing compartment and then extends upward to the position disposed vertically between the bottom of the bearing compartment and the seal;

the scavenge line first extends vertically downward from the outlet and the bottom of the bearing compartment and exits the core casing, and then extends upward outside of the core casing to the position disposed vertically between the bottom of the bearing compartment and the seal;

the bearing compartment comprises an inlet and the gas turbine engine further comprises a fluid supply line connected to the inlet;

a portion of the fluid supply line extends vertically upward;

the portion of the fluid supply line that extends vertically upward comprises a volume sufficient to contain enough lubricating fluid to replace air that bubbles out of lubricating fluid disposed inside the fluid trap of the scavenge line.

the bearing compartment comprises an inlet formed in the bottom of the bearing compartment and the gas turbine engine further comprises a fluid supply line connected to the inlet, wherein the fluid supply line first extends vertically downward from the inlet and the bottom of the bearing compartment and exits the core casing, and then extends upward to a position disposed vertically above the top of the bearing compartment; and/or the fluid trap axially aligned with the bearing compartment relative a center axis of the gas turbine engine.

In another embodiment, a gas turbine engine includes a core casing and a bearing compartment disposed within the core casing. The bearing compartment includes a bottom disposed vertically opposite a top and an outlet formed in the bottom of the bearing compartment. A seal is positioned vertically between the bottom of the bearing compartment and the top of the bearing compartment. A scavenge line is connected to the outlet. The scavenge line forms a fluid trap that first extends vertically downward from the outlet and the bottom of the bearing compartment and exits the core casing, and then extends upward to a position disposed vertically between the bottom of the bearing compartment and the seal.

The gas turbine engine of the preceding paragraph can optionally include, additionally and/or alternatively, any one or more of the following features, configurations and/or additional components:

the bearing compartment comprises an inlet formed in the bottom of the bearing compartment;

the gas turbine engine further comprises a fluid supply line connected to the inlet;

the fluid supply line first extends vertically downward from the inlet and the bottom of the bearing compartment and exits the core casing, and then extends vertically upward above the bottom of the bearing compartment;

a portion of the fluid supply line that extends vertically upward above the bottom of the bearing compartment comprises a volume that is greater than or equal to a volume of the fluid trap of the scavenge line;

an anti-siphon line is connected to the fluid supply line above the bearing compartment, wherein the anti-siphon line is configured to allow air at ambient pressure to enter the fluid supply line at engine shutdown;

a portion of the fluid supply line that extends vertically upward above the bottom of the bearing compartment comprises a volume sufficient to contain enough lubricating fluid to replace air that bubbles out of lubricating fluid disposed inside the fluid trap of the scavenge line;

the fluid trap is axially aligned with the outlet of the bearing compartment relative a center axis of the gas turbine engine; and/or the seal is a carbon seal.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIG. 2 shows first supply line 82a and second supply line 82b both connecting to main line 78, first supply line 82a and second supply line 82b can each be connected to a different main line and different fluid tank respectively. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprises:
 a bearing compartment, wherein the bearing compartment comprises:
  a bottom disposed opposite a top;
  an outlet formed in the bottom of the bearing compartment; and
  a seal positioned between the bottom of the bearing compartment and the top of the bearing compartment,
  wherein the bearing compartment is disposed within a core casing of the gas turbine engine; and
 a scavenge line first extends vertically downward from the outlet and the bottom of the bearing compartment and exits the core casing, and then extends upward outside of the core casing to a position disposed vertically between the bottom of the bearing compartment and the seal to form a fluid trap.

2. The gas turbine engine of claim 1, wherein the bearing compartment comprises an inlet and the gas turbine engine further comprises a fluid supply line connected to the inlet.

3. The gas turbine engine of claim 2, wherein a portion of the fluid supply line extends vertically upward.

4. The gas turbine engine of claim 3, wherein the portion of the fluid supply line that extends vertically upward comprises a volume sufficient to contain enough lubricating fluid to replace air that bubbles out of lubricating fluid disposed inside the fluid trap of the scavenge line.

5. The gas turbine engine of claim 1, wherein the bearing compartment comprises an inlet formed in the bottom of the bearing compartment and the gas turbine engine further comprises a fluid supply line connected to the inlet, wherein the fluid supply line first extends vertically downward from the inlet and the bottom of the bearing compartment and exits the core casing, and then extends upward to a position disposed vertically above the top of the bearing compartment.

6. The gas turbine engine of claim 1, wherein the fluid trap is axially aligned with the bearing compartment relative a center axis of the gas turbine engine.

7. A gas turbine engine comprises:
a core casing
a bearing compartment disposed within the core casing, wherein the bearing compartment comprises:
  a bottom disposed vertically opposite a top;
  an outlet formed in the bottom of the bearing compartment;
  a seal positioned vertically between the bottom of the bearing compartment and the top of the bearing compartment; and
  an inlet formed in the bottom of the bearing compartment;
a scavenge line connected to the outlet, wherein the scavenge line forms a fluid trap that first extends vertically downward from the outlet and the bottom of the bearing compartment and exits the core casing, and then extends upward to a position disposed vertically between the bottom of the bearing compartment and the seal; and
a fluid supply line connected to the inlet, wherein the fluid supply line first extends vertically downward from the inlet and the bottom of the bearing compartment and exits the core casing, and then extends vertically upward above the bottom of the bearing compartment.

8. The gas turbine engine of claim 7, wherein a portion of the fluid supply line that extends vertically upward above the bottom of the bearing compartment comprises a volume sufficient to contain enough lubricating fluid to replace air that bubbles out of lubricating fluid disposed inside the fluid trap of the scavenge line.

9. The gas turbine engine of claim 8, wherein the fluid trap is axially aligned with the outlet of the bearing compartment relative a center axis of the gas turbine engine.

10. The gas turbine engine of claim 7, wherein an anti-siphon line is connected to the fluid supply line above the bearing compartment, wherein the anti-siphon line is configured to allow air at ambient pressure to enter the fluid supply line at engine shutdown.

11. The gas turbine engine of claim 7, wherein a portion of the fluid supply line that extends vertically upward above the bottom of the bearing compartment comprises a volume that is greater than or equal to a volume of the fluid trap of the scavenge line.

12. The gas turbine engine of claim 7, wherein the seal is a carbon seal.

* * * * *